United States Patent [19]

Bujalski et al.

[11] Patent Number: 4,962,175

[45] Date of Patent: Oct. 9, 1990

[54] ALKYLPOLY (POLYSILYL) AZANE PRECERAMIC POLYMERS

[75] Inventors: Duane R. Bujalski, Bay City; Gary E. LeGrow; Thomas F. Lim, both of Midland, all of Mich.

[73] Assignee: Dow Corning Corporation, Midland, Mich.

[21] Appl. No.: 945,125

[22] Filed: Dec. 22, 1986

[51] Int. Cl.$^5$ .............................................. C08G 77/06
[52] U.S. Cl. ........................................ 528/19; 528/21; 528/23; 528/25; 528/33; 528/38; 528/43; 556/430; 525/474
[58] Field of Search ...................... 528/33, 25, 38, 43, 528/21, 23, 19; 556/430; 525/474

[56] References Cited

U.S. PATENT DOCUMENTS

| | | | |
|---|---|---|---|
| 4,314,956 | 2/1982 | Baney et al. | 528/28 |
| 4,482,669 | 11/1984 | Seyforth et al. | 528/28 |
| 4,611,035 | 9/1986 | Brown-Wensley et al. | 528/31 |
| 4,645,807 | 2/1987 | Seyferth et al. | 528/31 |
| 4,650,837 | 3/1987 | Seyferth et al. | 528/31 |

*Primary Examiner*—Melvyn I. Marquis
*Attorney, Agent, or Firm*—James E. Bittell; Robert L. McKellar

[57] ABSTRACT

Alkylpoly(polysilyl)azanes are prepared by the reaction of chlorine-containing polysilane preceramic polymers and various disilazanes. The alkylpoly(polysily)azanes may be converted to ceramic materials by pyrolysis at elevated temperatures.

55 Claims, No Drawings

ALKYLPOLY (POLYSILYL) AZANE PRECERAMIC POLYMERS

STATEMENT OF GOVERNMENT RIGHTS

The United States Government has rights in this invention pursuant to Contract Number F33615-83-C-5006 awarded by the United States Air Force.

BACKGROUND OF THE INVENTION

This invention relates to alkylpoly(polysilyl)azanes, and especially methylpoly(polysilyl)azanes, which are useful as preceramic polymers in the preparation of ceramic materials and articles. This invention further relates to the methods of preparing such alkylpoly(polysilyl)azanes and methylpoly(polysilyl)azanes as well as the ceramics prepared from such preceramic polymers.

Baney et al. U.S. Pat. No. 4,310,651 (issued Jan. 12, 1982) disclosed a polysilane of general formula ($CH_3Si$)(($CH_3)_2Si$) where there was present 0 to 60 mole percent (($CH_3)_2Si$) units and 40 to 100 mole percent ($CH_3Si$) units and where the remaining bonds on silicon were attached to other silicon atoms and chlorine atoms or bromine atoms. The polysilane was converted to a beta-silicon carbide containing ceramic material at elevated temperatures (about 1400° C.). The polysilanes of U.S. Pat. No. 4,310,651 generally are difficult to handle due to their high reactivity in air.

Baney et al. in U.S. Pat. No. 4,298,559 (issued Nov. 3, 1981) prepared polysilanes of general formula ($CH_3Si$)(($CH_3)_2Si$) where there was present 0 to 60 mole percent (($CH_3)_2Si$) units and 40 to 100 mole percent ($CH_3Si$) units and where the remaining bonds on silicon were attached to other silicon atoms and additional alkyl radicals of 1 to 4 carbon atoms or phenyl radicals. Upon heating these polysilanes were converted into silicon carbide containing ceramics in high yields.

Baney et al. in U.S. Pat. No. Re. 31,447 (reissued Nov. 22, 1983) disclosed polysilanes of the general formula ($CH_3Si$)(($CH_3)_2Si$) where there was present 0 to 60 mole percent (($CH_3)_2Si$) units and 40 to 100 mole percent ($CH_3Si$) units and where the remaining bonds on silicon were attached to other silicon atoms and alkoxy radicals containing 1 to 4 carbon atoms or phenoxy radicals. Silicon carbide-containing ceramics were obtained by firing these polysilanes to elevated temperatures.

Baney et al. in U.S. Pat. No. 4,314,956 (issued Feb. 9, 1982) disclosed polysilanes of the general formula ($CH_3Si$)(($CH_3)_2Si$) where there was present 0 to 60 mole percent (($CH_3)_2Si$) units and 40 to 100 mole percent ($CH_3Si$ units and where the remaining bonds on silicon were attached to silicon and amine radicals of the general formula $-NHR'''$ where $R'''$ is a hydrogen atom an alkyl radical of 1 to 4 carbon atoms or a phenyl radical. A silicon carbide-containing ceramic is obtained by firing this polysilane to an elevated temperature under an inert atmosphere or under an ammonia atmosphere.

The just discussed U.S. Pat. Nos. 4,310,651, 4,298,599, Re. 31,447 and, 4,314,956 are hereby incorporated by reference. These polysilanes are further discussed in Baney et al. *Organometallics*, 2, 859 (1983).

Haluska in U.S. Pat. No. 4,546,163 (issued Oct. 8, 1985), which is hereby incorporated by reference, prepared polysilanes of the average formula $(RSi)(R_2Si)(R''''_d(CH_2=CH)Si)$ where there was present from 0 to 60 mole percent ($R_2Si$) units, 30 to 99.5 mole percent (RSi) units, 0.5 to 15 mole percent ($R''''_d(CH_2=CH)Si$) units, where the remaining bonds on silicon are attached to other silicon atoms and chlorine atoms or bromine atoms where R is an alkyl radical containing from 1 to 4 carbon atoms where $R''''$ is an alkyl radical containing 1 to 4 carbon atoms, a vinyl radical or a phenyl radical, and where d is 1 or 2. Polysilanes of the same average formula but containing alkyl, aryl alkoxy, aryloxy substituted amine, or unsubstituted amine radicals attached to silicon were also prepared. These polysilanes could be pyrolyzed at elevated temperatures in an inert atmosphere to produce silicon carbide-containing ceramics. The vinyl-containing polysilanes could be cured, and thus rendered infusible, prior to pyrolysis by exposure to ultraviolet light.

West in U.S. Pat. No. 4,260,780 (issued Apr. 7, 1981) prepared a polysilane of general formula (($CH_3)_2Si$)($CH_3(C_6H_5)Si$) by the sodium metal reduction of dimethyldichlorosilane and methylphenylsilane. The resulting methylphenylpolysilanes had very high softening points (>280° C.).

West et al. in *Polym. Prepr.*, 25, 4 (1984) disclosed the preparation of a polysilane of the general formula ($CH_3(CH_2=CHCH_2)Si$)($CH_3(C_6H_5)Si$) by the sodium metal reduction of allylmethyldichlorosilane and methylphenyldichlorosilane. These polysilanes were rapidly gelled by irradiation with ultraviolet light.

What has been newly discovered ere alkylpoly(polysilyl)azanes of unit formulae

  (I)

and

  (II)

where R is independently selected from alkyl radicals containing 1 to 4 carbon atoms, where there are also bonded to the silicon atoms other silicon atoms and radicals having the formula $-NHSiR_3''$ wherein $R''$ is hydrogen, alkyl radicals having 1 to 4 carbon atoms, a vinyl radical, or a phenyl radical and where, for alkylpoly(polysilyl)azane (II), R' is independently selected from the group consisting of alkyl radicals of at least six carbon atoms, phenyl radicals, and radicals of the formula $A_yX_{(3-y)}Si(CH_2)_z-$ where A is selected from hydrogen or alkyl radicals containing 1 to 4 carbon atoms, y is an integer equal to 0 to 3, X is chlorine or bromine, and z is an integer greater than or equal to 1. These alkylpoly(polysilyl)azane preceramic polymers can by pyrolyzed at elevated temperatures under an inert atmosphere to yield ceramic materials or articles. These alkylpoly(polysilyl)azanes represent a significant advance in the art of preparing ceramic materials or articles, especially in the art of preparing ceramic fibers.

THE INVENTION

This invention relates to alkylpoly(polysilyl)azanes of the average formula

  (I)

containing from 0 to 60 mole percent ($R_2Si$) units and 40 to 100 mole percent (RSi) units, where each R is independently selected from alkyl radicals containing 1 to 4 carbon atoms and where there is also bonded to the silicon atoms and radicals having the formula —NHSiR$_3''$ wherein each R'' is independently selected from hydrogen, alkyl radicals having 1 to 4 carbon atoms a vinyl radical, or a phenyl radical.

This invention also relates to alkylpoly(polysilyl)azanes of the average formula $$(R_2Si)(RSi)(R'Si) \qquad (II)$$

where each R is independently selected from alkyl radicals containing 1 to 4 carbon atoms wherein each R' is independently selected from the group consisting of alkyl radicals of at least six carbon atoms, phenyl radicals, and radicals of the formula A$_y$X$_{(3-y)}$Si(CH$_2$)$_z$— where each A is independently selected from a hydrogen atom or alkyl radicals containing 1 to 4 carbon atoms, y is an integer equal to 0 to 3, X is chlorine or bromine and z is an integer greater than or equal to 1, wherein there are from 0 to 40 mole percent, 1 to 99 mole percent (RSi), and 1 to 99 mole percent (R'Si) units, and wherein there is also bonded to the silicon atoms other silicon atoms and radicals having the formula —NHSiR$_3''$ wherein each R'' is independently selected from a vinyl radical, alkyl radicals having 1 to 4 carbon atoms or a phenyl radical.

This invention further relates to a method of preparing a alkylpoly(polysilyl)azane having the average formula $$(R_2Si)(RSi) \qquad (I)$$

where there are from 0 to 60 mole percent (R$_2$Si) units and 40 to 100 mole percent (RSi) units, where each R is independently selected from alkyl radicals containing 1 to 4 carbon atoms, and wherein there is also bonded to the silicon atoms other silicon atoms and radicals having the formula —NHSiR$_3''$ where each R'' is independently selected from hydrogen, alkyl radicals having 1 to 4 carbon atoms, a vinyl radical, or a phenyl radical, which method comprises (A) reacting under anhydrous conditions (1) a polysilane having the average formula $$(R_2Si)(RSi) \qquad (III)$$

in which there are from 0 to 60 mole percent (R$_2$Si) units and 40 to 100 mole percent (RSi) units, wherein each R is independently selected from alkyl radicals containing 1 to 4 carbon atoms, and where the remaining bonds on silicon are attached to either other silicon atoms, chlorine atoms, or bromine atoms with (2) a disilazane of general formula (R$_3''$Si)$_2$NH wherein each R'' is independently selected from hydrogen, alkyl radicals containing 1 to 4 carbon atoms, a vinyl radical, or a phenyl radical at a temperature of 50° C. to 300° C. and (B) thereafter recovering the alkylpoly(polysilyl)azane.

This invention further relates to a method of preparing an alkylpoly(polysilyl)azane having the average formula $$(R_2Si)(RSi)(R'Si) \qquad (III)$$

where each R is independently selected from alkyl radicals containing 1 to 4 carbon atoms, wherein each R' is selected from the group consisting of alkyl radicals of at least six carbon atoms, phenyl radicals, and radicals of the formula A$_y$X$_{(3-y)}$Si(CH$_2$)$_z$— where each A is independently selected from a hydrogen atom or alkyl radicals containing 1 to 4 carbon atoms, y is an integer equal to 0 to 3, X is chlorine or bromine, and z is an integer greater than or equal to 1, wherein there are from 0 to 40 mole percent (R$_2$Si) units, 1 to 99 mole percent (RSi), and 1 to 99 mole percent (R'Si) units, and where there is also bonded to the silicon atoms other silicon atoms and radicals having the formula —NHSiR$_3''$ where each R'' is independently selected from hydrogen, alkyl radicals having 1 to 4 carbon atoms, a vinyl radical, or a phenyl radical, which method comprises (A) reacting under anhydrous conditions (1) a polysilane having the average formula $$(R_2Si)(RSi)(R'Si) \qquad (IV)$$

in which each R is independently selected from alkyl radicals containing 1 to 4 carbon atoms, R' is selected from the group consisting of alkyl radicals of at least six carbon atoms, phenyl radicals, and radicals of the formula A$_y$X$_{(3-y)}$Si(CH$_2$)$_z$— where each A is independently selected from a hydrogen atom or alkyl radicals containing 1 to 4 carbon atoms, y is an integer equal to 0 to 3, X is chlorine or bromine, and z is an integer greater than or equal to 1, and there are from 0 to 40 mole percent (R$_2$Si) units, 1 to 99 mole percent (RSi), and 1 to 99 mole percent (R'Si) units, wherein the remaining bonds on silicon are attached to either other silicon atoms, chlorine atoms, or bromine atoms with a (2) a disilazane of the general formula (R$_3''$Si)$_2$NH where each R'' is independently selected from hydrogen, alkyl radicals containing 1 to 4 carbon atoms, a vinyl radical, or a phenyl radical at a temperature of 50° C. to 300° C. and (B) thereafter recovering the alkylpoly(polysilyl)azane.

The chlorine- or bromine-containing polysilanes useful in this invention are described by the average formulae $$(R_2Si)(RSi) \qquad (III)$$

and $$(R_2Si)(RSi)(R'Si) \qquad (IV)$$

where each R is independently selected from alkyl radicals containing 1 to 4 carbon atoms and, for polysilane IV, each R' is independently selected from the group consisting of alkyl radicals of at least six carbon atoms, phenyl radicals, and radicals of the formula A$_y$X$_{(3-y)}$Si(CH$_2$)$_z$— where each A is independently selected from a hydrogen atom or alkyl radicals containing 1 to 4 carbon atoms, y is an integer equal to 0 to 3, X is chlorine or bromine, and z is an integer greater than or equal to 1, where, for polysilane III, there are from 0 to 60 mole percent (R$_2$Si) units and 40 to 100 mole percent (RSi) units, and where, for polysilane IV there are from 0 to 40 mole percent (R$_2$Si) units, 1 to 99 mole percent (RSi) units, and 1 to 99 mole percent (R'Si) units, wherein the remaining bonds on silicon in both polysilanes III and IV are attached to either other silicon atoms, chlorine atoms, or bromine atoms. These are chlorine- or bromine-containing polysilanes where the remaining bonds on silicon are attached to other silicon atoms and chlorine atoms or bromine atoms. The chlorine-containing polysilanes are preferred in the practice of this invention. Preferably the polysilane IV contains from 0 to 40 mole percent (R$_2$Si) units, 40 to 99 mole percent (RSi), and 1 to 30 mole percent (R'Si) units. Most preferably the polysilane IV contains from 0 to 10 mole percent ($R_2Si$) units, 80 to 99 mole percent (RSi), and 1 to 20 mole percent (R'Si) units.

The chlorine- or bromine-containing polysilanes III can be prepared by the methods described in Baney in U.S. Pat. No. 4,534,948 which has been incorporated by reference. In general, these polysilanes may be prepared by treating one or more chlorine-containing or bromine-containing disilanes with 0.001 to 10 weight percent of a rearrangement catalyst at a temperature of 100° C. to 340° C. for a period of 1 to 48 hours while distilling by-produced volatile materials.

The chlorine- or bromine-containing polysilanes IV may be prepared by the method described in the copending U.S. patent application in the names of Duane Ray Bujalski, Gary Edward LeGrow, and Thomas Fay-oy Lim, entitled "Polysilane Preceramic Polymers" which was filed on the same date as this present application and which is hereby incorporated by reference. In general these polysilanes may be prepared by reacting a mixture of about 40–99 weight percent of one or more chlorine-containing or bromine-containing disilanes and 1 to 60 weight percent of one or more monoorganosilanes of formula $R'SiX_3$ where R' is selected from the group consisting of alkyl radicals of at least six carbon atoms, phenyl radicals, and radicals of the formula $A_yX_{(3-y)}Si(CH_2)_z$— where each A is independently selected from a hydrogen atom or alkyl radicals containing 1 to 4 carbon atoms, y is an integer equal to 0 to 3, X is chlorine or bromine, and z is an integer greater than or equal to 1, with 0.001 to 10 weight percent of a rearrangement catalyst at a temperature of 100° C. to 340° C. while distilling by-produced volatile materials. Preferably these polysilanes may be prepared by reacting a mixture of about 70–99 weight percent of one or more chlorine-containing or bromine-containing disilanes and 1 to 30 weight percent of one or more monoorganosilanes of formula $R'SiX_3$ where R' is selected from the group consisting of alkyl radicals of at least six carbon atoms, phenyl radicals, and radicals of the formula $A_yX_{(3-y)}Si(CH_2)_z$— where each A is independently selected from a hydrogen atom or alkyl radicals containing 4 carbon atoms, y is an integer equal to 0 to 3, X is chlorine or bromine, and z is an integer greater than or equal to 1, with 0.001 to 10 weight percent of a rearrangement catalyst at a temperature of 100° C. to 340° C. while distilling by-produced volatile materials.

The chlorine-containing or bromine-containing disilanes used to prepare the chlorine- or bromine-containing polysilanes III or IV are of the general formula $(R_bX_cSi)_2$ wherein R is an alkyl radical containing from 1 to 4 carbon atoms, b has a value of 0 to 2.5, c has a value of 0.5 to 3, the sum (b+c) equals three, and X is chlorine or bromine. R in the above disilane may be methyl, ethyl, propyl or butyl. Examples of such disilanes include $CH_3Cl_2SiSiCl(CH_3)_2$, $CH_3Cl_2SiSiCl_2CH_3$, $CH_3Br_2SiSiBr(CH_3)_2$, $CH_3Br_2SiSiBr_2CH_3$ and the like. Preferably in the above disilane R is a methyl radical and X is chlorine. The disilane can be prepared from the appropriate silanes or the disilane can be utilized as it is found as a component of the process residue from the direct synthesis of organochlorosilanes. The direct synthesis of organochlorosilanes involves passing the vapor of an organic chloride over heated silicon and a catalyst. See Eaborn, "Organosilicon Compounds," *Butterworths Scientific Publications*, 1960 page 1. The disilanes $CH_3Cl_2SiSiCl_2CH_3$ and $(CH_3)_2ClSiSiCl_2CH_3$ are found in large quantities in the residue from the reaction and, therefore, this Direct Process residue is a good starting material for obtaining the polysilane polymers used in this invention.

The monoorganosilanes used to prepare the chlorine- or bromine-containing polysilanes IV are of formula $R'SiX_3$ where R' is selected from the group consisting of alkyl radicals of at least six carbon atoms, phenyl radicals, and radicals of the formula $A_yX_{(3-y)}Si(CH_2)_z$— where A is a hydrogen atom or an alkyl radical containing 1 to 4 carbon atoms, y is an integer equal to 0 to 3, X is chlorine or bromine, and z is an integer greater than or equal to 1. The A radicals in the formula $A_yX_{(3-y)}Si(CH_2)_z$— may be the same or different. Generally the monoorganosilane should have a boiling point of about 180° C. or greater at one atmosphere. Examples of suitable monoorganosilanes include phenyltrichlorosilane, n-hexyltrichlorosilane, n-octyltrichlorosilane, phenyltribromosilane, n-octyltribromosilane, $Cl_3SiCH_2CH_2SiCl_3$, $CH_3Cl_2SiCH_2CH_2SiCl_3$, $(CH_3)ClSiCH_2CH_2SiCl_3$, $H(CH_3)_2SiCH_2CH_2SiCl_3$, and the like. Phenyltrichlorosilane and n-octyltrichlorosilane are the preferred monoorganosilanes.

Mixtures of such monoorganosilanes may also be used. Indeed, mixtures of monoorganosilanes are generally preferred in the preparation of polysilane IV. One especially preferred mixture of monoorganosilanes is n-octyltrichlorosilane and phenyltrichlorosilane. The use of such monoorganosilanes, either singly or in mixtures, appears to allow for control of both the softening or glass transition temperatures of the polysilanes IV and alkylpoly(polysilyl)azanes II and the relative silicon and carbon content of the ceramic materials produced from such alkylpoly(polysilyl)azanes by a variation of the (R'Si) content in the polysilanes IV. In general it appears that increasing the (R'Si) content of the polysilanes IV, and thus the alkylpoly(polysilyl)azanes II, results in a reduction in the glass transition temperature. Incorporation of (n-octyl-Si) units allows for a significant reduction of the glass transition temperature with the amount of the reduction being dependent on the level of (n-octyl-Si) units in the alkylpoly(polysilyl)azanes. Incorporation of (phenyl-Si) units also results in a decrease in the glass transition temperature but the observed effect is generally less than for incorporation of (n-octyl-Si) units. Upon pyrolysis of the alkylpoly(polysilyl)azanes containing (n-octyl-Si) units, it appears that the n-octyl group is lost from the ceramic material as an olefin thereby leaving the ceramic material carbon deficient relative to ceramic materials prepared from similar polymers without (n-octyl-Si) units. It is expected that other alkyl groups containing at least six carbon atoms will behave in a similar manner. Phenyl groups are generally not lost upon pyrolysis. Therefore, pyrolysis of the alkylpoly(polysilyl)azanes containing (phenyl-Si) units allows more carbon to be incorporated into the final ceramic material and therefore produces ceramic materials that are carbon rich relative to ceramic materials prepared from similar polymers without (phenyl-Si) units. Thus by incorporation of (R'Si) units where R' is n-octyl and phenyl the relative silicon and carbon content of the resulting ceramic materials can be controlled to a large extent. It is possible by the practice of this invention to prepare ceramic materials containing SiC with either excess carbon or excess silicon as well as stoichiometric amounts of silicon and carbon. Methyl radicals in the form of ($CH_3Si$) or (($CH_3)_2Si$) units are generally not lost on pyrolysis. Therefore, the relative amounts of silicon and carbon will also depend in part on the presence of the other units in the alkylpoly(polysilyl)azanes but the incorporation of (n-octyl-Si) and (phenyl-Si) units can be used to "fine tune" the relative silicon and carbon content of the ceramics.

The disilanes or disilane and monoorganosilane mixtures are reacted in the presence of a rearrangement catalyst. Suitable rearrangement catalysts include ammonium halides, tertiary organic amines, quaternary ammonium halides, quaternary phosphonium halides, hexamethylphosphoramide, and silver cyanide. Preferred catalyst includes quaternary ammonium halides having the formula $W_4NX'$, quaternary phosphonium halides having the formula $W_4PX'$, and hexamethylphosphoramide where W is an alkyl or aryl radical and X' is halogen. Preferably W is an alkyl radical containing 1 to 6 carbon atoms or a phenyl radical and X' is chlorine or bromine. One especially preferred catalyst is tetra-n-butylphosphonium bromide.

The amount of catalyst utilized can range from 0.001 to 10 weight percent and preferably from 0.1 to 2.0 weight percent based on the weight of the starting disilane or starting disilane/monoorganosilane mixture. The catalysts and starting materials require anhydrous conditions and therefore one must take care to insure that moisture is excluded from the reaction system when the reactants are mixed. Generally this can be done by using a stream of dry nitrogen or argon as a cover over the reaction mixture.

The disilane or mixture of about 40 to 99 weight percent disilane or disilanes and 1 to 60 weight percent monoorganosilane or monoorganosilanes are reacted in the presence of 0.001 to 10 weight percent of a rearrangement catalyst at a temperature of 100° C. to 340° C. while distilling by-produced volatile materials until there is produced the chlorine-containing or bromine-containing polysilane III or IV, respectively. Preferably the reaction mixture contains 70 to 99 weight percent disilane or disilanes and 1 to 30 weight percent monoorganosilane or monoorganosilanes. Most preferably the reaction mixture contains 80 to 98 weight percent disilane or disilanes and 2 to 20 weight percent monoorganosilane or monoorganosilanes. The order of mixing the reactants is not critical. Preferably the reaction temperature is from 150° to 300° C. When the final reaction temperature in the preparation of the polysilane IV is higher than the boiling point of the monoorganosilane, it is preferred that the reaction temperature be raised slowly to the final temperature so that the monoorganosilane will have a greater tendency to incorporate into the polymer as opposed to simply distilling out of the reaction mixture. The incorporation of the monoorganosilane may also be increased by removing the volatile by-products only in the later stages of the reaction. Typically the reaction is carried out for about 1 to 48 hours although other time durations may be employed.

By the practice of this invention the highly reactive chlorine or bromine atoms of the chlorine- or bromine-containing polysilanes III and IV may be replaced by the less reactive group —$NHSiR_3''$ wherein R'' is hydrogen, an alkyl radical having 1 to 4 carbon atoms, a vinyl radical, or a phenyl radical thereby forming the alkylpoly(polysilyl)azane preceramic polymers of this invention.

The alkylpoly(polysilyl)azanes of this invention are prepared by treating a chlorine- or bromine-containing polysilane, such as polysilanes III or IV, with a disilazane of general formula $(R_3''Si)_2NH$ where R'' is hydrogen, an alkyl radical containing 1 to 4 carbon atoms, a vinyl radical, or a phenyl radical at a temperature of 50° C. to 300° C. Typically the reaction is carried out for about 1 to 48 hours although other time durations may be employed. The polysilanes are reacted with a disilazane of the general formula $(R_3''Si)_2NH$. R'' in this formula is hydrogen, an alkyl radical of 1 to 4 carbon atoms, a vinyl radical or a phenyl radical. Therefore R'', for purposes of this formula, is represented by hydrogen, methyl, ethyl, propyl, butyl, vinyl and phenyl. Each R'' group in this formula can be the same or they can be different. Examples of the disilazanes include $((CH_3)_3Si)_2NH$, $(C_6H_5(CH_3)_2Si)_2NH$, $((C_6H_5)_2CH_3Si)_2NH$, $(CH_2=CH(CH_3)_2Si)_2NH$, $(CH_2=CH(CH_3)(C_6H_5)Si)_2NH$, $(CH_2=CH(C_6H_5)_2Si)_2NH$, $(CH_2=CH(C_2H_5)_2Si)_2NH$, $(H(CH_3)_2Si)_2NH$, and $(CH_2=CH(C_6H_5)(C_2H_5)Si)_2NH$. The preferred disilazane is hexamethyldisilazane.

The chlorine- or bromine-containing polysilanes and disilazanes may be reacted in either the presence or absence of a rearrangement catalyst. The reaction in the presence of a rearrangement catalyst is generally preferred. Suitable rearrangement catalysts are the same rearrangement catalysts used in preparing the starting chlorine- or bromine-containing polysilanes and include ammonium halides, tertiary organic amines, quaternary ammonium halides, quaternary phosphonium halides, hexamethylphosphoramide and silver cyanide. Preferred catalyst includes quaternary ammonium halides having the formula $W_4NX'$, quaternary phosphonium halides having the formula $W_4PX'$, and hexamethylphosphoramide where W is an alkyl or aryl radical and X' is halogen. Preferably W is an alkyl radical containing 1 to 6 carbon atoms or a phenyl radical and X' is chlorine or bromine. The most preferred catalyst is tetra-n-butylphosphonium bromide. The amount of catalyst, when used, will generally be in the range of 0.001 to 10 weight percent and preferably 0.1 to 2.0 weight percent based on the weight of the polysilane and disilazane mixture. The catalysts and starting materials require anhydrous conditions and therefore one must take care to insure that moisture is excluded from the reaction system when the reactants are mixed. Generally this can be done by using a stream of dry nitrogen or argon as a cover over the reaction mixture.

Solvents for the starting chlorine- or bromine-containing polysilanes can be any organic solvent in which the material is soluble and which does not react with the material except in the desired manner. Solvents, although useful, are not required. Examples of suitable solvents include toluene, xylene, benzene, tetrahydrofuran, ethers, and the disilazanes themselves. Specifically, toluene or the disilazane solvents are preferred. When the disilazane is used as the solvent, the reactant disilazane is simply added in excess and acts as both a reactant and as solvent. Use of the disilazane, and especially hexamethyldisilazane, as the solvent is most preferred. The addition of the disilazane reactant and the reaction itself is carried out while the materials are stirred or otherwise agitated. The reaction is carried out in a inert, essentially anhydrous atmosphere to prevent the introduction of water or oxygen into the reaction vessel. By "inert" we mean that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated. The reaction can be run at temperatures of 50° C. to 300° C. but preferably the reaction temperature is 150° C. to 250° C. Typically the reaction is carried out for a time period of about 1 to 48 hours.

As noted above, it is preferred that the reaction between the polysilane and, for example, hexamethyldisilazane be carried out in the presence of excess hexamethyldisilazane such that the hexamethyldisilazane acts as both reactant and solvent. The use of hexamethyldisilazane in this manner results in greater replacement of the chlorine or bromine of the polysilanes with —NHSi(CH$_3$)$_3$ groups relative to the same reaction carried out in the presence of other organic solvents such as toluene. For example, using methylpolysilanes and hexamethyldisilazane as reactant and solvent has given methylpoly(polysilyl)azanes containing as little as about 0.8 weight percent chlorine. Under similar reaction conditions but using toluene as the solvent, the resulting methylpoly(polysilyl)azane contained about 2.5 to 8.0 weight percent chlorine. The chlorine content of the alkylpoly(polysilyl)azane, prepared using no solvent, an organic solvent like toluene, or a disilazane solvent, may be further reduced by treating the alkylpoly(polysilyl)azane with ammonia. The alkylpoly(polysilyl)azane in a solvent such as toluene may be treated with anhydrous liquid ammonia to reduce the residual chlorine or bromine if desired. The resulting solution is filtered and solvent stripped under reduced pressure to obtain a low halide-containing alkylpoly(polysilyl)azane. Other methods of ammonia treatment to reduce the chlorine or bromine content may be used. It appears that ammonia may be used in a similar manner to reduce the halide content of other halide-containing preceramic polymers including polycarbosilanes, polysilanes, polysilazanes, and the like.

The alkylpoly(polysilyl)azanes may contain residual chlorine or bromine atoms and still be useful in this invention. The chlorine or bromine content of these alkylpoly(polysilyl)azanes is, however, less than the chlorine or bromine content of the starting non-derivatized alkylpolysilanes. Preferably the derivatized alkylpoly(polysilyl)azanes contain less than 5 weight percent chlorine or bromine; more preferably they contain less than 2 weight percent chlorine or bromine; even more preferably they contain less than 1 weight percent chlorine or bromine; and most preferably they contain less than 0.5 weight percent chlorine or bromine. The reduced levels of chlorine or bromine in these alkylpoly(polysilyl)azanes result in easier and safer handling of the alkylpoly(polysilyl)azanes relative to the non-derivatized alkylpolysilanes which contain significant amounts of chlorine of bromine.

The resulting alkylpoly(polysilyl)azanes are solids at 25° C. and have either the general formula $$(R_2Si)(RSi) \tag{I}$$

containing from 0 to 60 mole percent (R$_2$Si) units and 40 to 100 mole percent (RSi) units, where each R is independently selected from alkyl radicals containing 1 to 4 carbon atoms and where there are also bonded to the silicon atoms other silicon atoms and radicals having the formula —NHSiR$_3$″ wherein each R″ is independently selected from hydrogen, alkyl radicals having 1 to 4 carbon atoms, a vinyl radical, or a phenyl radical or the general formula $$(R_2Si)(RSi)(R'Si) \tag{II}$$

where each R is independently selected from alkyl radicals containing 1 to 4 carbon atoms, where each R′ is independently selected from the group consisting of alkyl radicals of at least six carbon atoms, phenyl radicals, and radicals of the formula A$_y$X$_{(3-y)}$Si(CH$_2$)$_z$— where each A is independently selected from a hydrogen atom or alkyl radicals containing 1 to 4 carbon atoms, y is an integer equal to 0 to 3, X is chlorine or bromine, and z is an integer greater than or equal to 1, and where there are from 0 to 40 mole percent (R$_2$Si) units, 1 to 99 mole percent (RSi), and 1 to 99 mole percent (R′Si) units, where there are also bonded to the silicon atoms other silicon atoms and radicals having the formula —NHSiR$_3$″ wherein each R″ is independently selected from hydrogen, alkyl radicals having 1 to 4 carbon atoms, a vinyl radical, or a phenyl radical. Preferably the alkylpoly(polysilyl)azane (II) contains from 0 to 40 mole percent (R$_2$Si) units, 40 to 99 mole percent (RSi), and 1 to 30 mole percent (R′Si) units. Most preferably the alkylpoly(polysilyl)azane (II) contains from 0 to 10 mole percent (R$_2$Si) units, 80 to 99 mole percent (RSi), and 1 to 20 mole percent (R′Si) units.

Especially preferred alkylpoly(polysilyl)azanes are the methylpoly(polysilyl)azanes of general formula ((CH$_3$)$_2$Si)(CH$_3$Si)(R′Si) where R′ is selected from the group consisting of alkyl radicals of at least six carbon atoms, phenyl radicals, and radicals of the formula A$_y$X$_{(3-y)}$Si(CH$_2$)$_z$— where each A is independently selected from a hydrogen atom or alkyl radicals containing 1 to 4 carbon atoms, y is an integer equal to 0 to 3, X is chlorine or bromine, and z is an integer greater than or equal to 1 and where there are from 0 to 40 mole percent ((CH$_3$)$_2$Si) units, 40 to 99 mole percent (CH$_3$Si), and 1 to 30 mole percent (R′Si) units, where there are also bonded to the silicon atoms other silicon atoms and radicals having the formula —NHSiR$_3$″ wherein each R″ is independently selected from hydrogen, alkyl radicals having 1 to 4 carbon atoms, a vinyl radical, or a phenyl radical. Preferably the methylpoly(polysilyl)azane contains from 0 to 40 mole percent ((CH$_3$)$_2$Si) units, 40 to 99 mole percent (CH$_3$Si), and 1 to 30 mole percent (R′Si) units. Most preferably the methylpoly(polysilyl)azane contains from 0 to 10 mole percent ((CH$_3$)$_2$Si) units, 80 to 99 mole percent (CH$_3$Si), and 1 to 20 mole percent (R′Si) units.

The alkylpoly(polysilyl)azanes of this invention may be converted to ceramic materials by pyrolysis to an elevated temperature of at least 750° C. in an inert atmosphere, vacuum or ammonia-containing atmosphere for a time sufficient to convert them to a ceramic material. Preferably the pyrolysis temperature is from about 1000° C. to about 1600° C. If the preceramic polymers are of sufficient viscosity or if they possess a sufficiently low melt temperature, they can be shaped and then pyrolyzed to give a ceramic shaped article such as a fiber. Preferably the preceramic polymer of this invention have a softening temperature of about 50° C. to 300° C. and most preferably in the range of 70° C. to 200° C. Such a softening temperature allows for the formation of preceramic fibers by known spinning techniques. As noted earlier, the softening or glass transition temperatures of the alkylpoly(polysilyl)azanes prepared from disilanes and monoorganosilanes of formula R′SiX$_3$ can be readily controlled by varying the content of the (R′Si) units in the alkylpoly(polysilyl)azanes.

So that those skilled in the art can better appreciate and understand the invention, the following examples are given. Unless otherwise indicated all percentages are by weight. The examples are intended to illustrate the invention and are not intended to limit the invention.

In the following examples, the analytical methods used were as follows:

The glass transition temperature, Tg, was determined on a Thermomechanical Analyzer, Model 1090, from Dupont Instruments. The glass transition temperature is related to the softening point.

Carbon, hydrogen, and nitrogen were determined on a C, H, N Elemental Analyzer, Model 1106. manufactured by Carlo Erba Strumentazione of Italy. The sample was combusted at 1030° C. and then passed over a chromium oxide bed at 650° C. and a copper bed at 650° C. The $N_2$, $CO_2$, and $H_2O$ produced were then separated and detected using a thermal conductivity detector.

Percent silicon was determined by a fusion technique which consisted of converting the silicon material to soluble forms of silicon and then analyzing the soluble material quantitatively for total silicon by atomic absorption spectrometry. Percent chlorine was determined by fusion of the sample with sodium peroxide and potentiometric titration with silver nitrate. Oxygen was determined using a Leco Oxygen Analyzer equipped with an Oxygen Determinater 316 (Model 783700) and an Electrode Furnace EF100 (Model 77600) manufactured by Leco Corporation, St. Joseph, Mich. The oxygen method involves the high temperature carbothermic reduction to CO with CO analysis by IR.

Thermogravimetric analyses (TGA) were carried out on a Netzsch STA 429 (2400° C.) TGA instrument manufactured by Netzsch Instruments, Selb, West Germany.

The preceramic polymers were fired to elevated temperature using either an Astro Industries Furnace 1000A (water cooled graphite heated model 1000.3060-FP-12) or a Lindberg furnace (Heavy Duty SB Type S4877A).

Chlorine-containing methylpolysilanes of the general formula $((CH_3)_2Si)(CH_3Si)$ were prepared by the general procedures outlined in U.S. Pat. No. 4,310,651. Chlorine-containing methylpolysilanes of the general formula $((CH_3)_2Si)(CH_3Si)(R'Si)$ were prepared by the general procedures outlined in the copending U.S. patent application by Duane Ray Bujalski, Gary Edward LeGrow, and Thomas Fay-oy Lim, entitled "Polysilane Preceramic Polymers" which was filed on the same date as this present application. Unless otherwise indicated, all procedures, including polymer preparation and disilazane derivatization, were carried out under an inert atmosphere of nitrogen or argon.

EXAMPLE 1

A chlorine-containing polysilane was prepared using the procedures of U.S. Pat. No. 4,310,651 by reacting 114.5 g (0.50 moles) $CH_3Cl_2SiSiCl_2CH_3$ in the presence of 1.1 g tetra-n-butylphosphonium bromide under an inert atmosphere. The disilane contained about 1.7 percent $CH_3Cl_2SiSiCl(CH_3)_2$. The reaction temperature was raised from room temperature to 86° C. at a rate of 5.0° C./min. from 86° to 125° C. at a rate of 2.0° C./min, and held at 125° C. for 6 minutes all the while removing by-produced volatile products by distillation. The chlorine-containing polysilane contained about 58 percent chlorine. After cooling the chlorine-containing polysilane to room temperature, 156.6 g (0.97 moles) of hexamethyldisilazane was added to the polysilane in the same reaction setup used to prepare the polysilane. The temperature was raised to 160° C. at a rate of 1.0° C./min. The resulting polymer contained 10.5 percent chlorine. This polymer was then dissolved in toluene and transferred to a 2.4 liter autoclave which was then pressurized to about 90 psi with ammonia. This mixture was kept at room temperature over night. After purging the autoclave with argon the polymer was filtered and the solvent removed by stripping at about 220° C. and 20 torr for about 5 minutes. The final ammonia-treated methylpoly(polysilyl)azane contained less than 0.1 percent chlorine and had the following elemental composition: 48.8% silicon, 26.7% carbon, 8.22% hydrogen, 15.8% nitrogen, and 1.54% oxygen. The methylpoly(polysilyl)azane was soluble in toluene and had a glass transition temperature of 188.7° C. The number average and weight average molecular weights were 1512 and 5043 g/mole, respectively. The methylpoly(polysilyl)azane was converted to a ceramic material in 67.0 percent yield by pyrolysis to 1200° C. at a rate of about 4.1° C./min. The ceramic material contained 57.2% silicon, 18.2% carbon, 0.2% hydrogen, 22.0% nitrogen, 0.6% oxygen, and 0.2% chlorine.

EXAMPLE 2

Several chlorine-containing polysilanes were prepared using the same materials and procedures as in Example 1 except that they contained less chlorine. The reduced chlorine levels of the starting chlorine-containing polysilanes was obtained by varying the reaction conditions of the disilane with the tetra-n-butylphosphonium bromide. For sample A the disilane and the catalyst were heated from room temperature to 80° C. at a rate of 5.0° C./min, 80° to 125° C. at 2.0° C./min. held at 125° C. for 21 minutes, and then 125° to 180° C. at 1.5° C./min; for sample B, the disilane and the catalyst were heated from room temperature to 80° C. at a rate of 5.0° C./min., 80° to 125° C. at 2° C./min, held at 125° C. for 10 minutes, 125° to 130° C. at 2.0° C./min, held at 130° C. for 29 minutes, and 130° to 250° C. at 1.5° C./min. The chlorine-containing polysilanes A and B contained 40.3 and 21.2 percent chlorine, respectively. Each polysilane was derivatized with hexamethyldisilazane and then treated with ammonia as in Example 1 except that the hexamethyldisilazane derivatization was carried out in toluene for A and in xylene for B. Sample B contained 11.4 percent chlorine after the disilazane derivatization. Methylpoly(polysilyl)azane A was soluble in toluene; B was a toluene-insoluble, intractable solid. The following results were obtained for the final, non-pyrolyzed, ammonia treated methylpoly(polysilyl)azanes.

| | A | B |
|---|---|---|
| Tg, °C. | 234.9 | — |
| Si, % | 50.2 | 51.2 |
| C, % | 29.1 | 27.4 |
| H, % | 8.16 | 7.45 |
| N, % | 10.3 | 5.3 |
| O, % | 2.82 | 2.94 |
| Cl, % | 0.14 | 0.43 |
| Molecular Weight (g/mole): | | |
| Number Av. | 2170 | 1324 |

-continued

| | A | B |
|---|---|---|
| Weight Av. | 28616 | 10270 |

The polymers were then fired to 1200° C. under argon as in Example 1. The following results were obtained. Hydrogen was not detected.

| | A | B |
|---|---|---|
| Ceramic Yield, % | 62.5 | 79.4 |
| Si, % | 63.7 | 64.0 |
| C, % | 23.0 | 22.4 |
| N, % | 12.0 | 5.99 |
| O, % | 1.34 | 4.56 |
| Cl, % | 0.10 | 0.18 |

Since the methylpoly(polysilyl)azane B was an intractable solid it could not be formed into a shaped article prior to pyrolysis as could A. However, B could, for example, be used to prepare ceramic powders.

EXAMPLE 3

Several chlorine-containing methylpolysilanes with $(CH_3(CH_2)_7Si)$ units were prepared using the same general procedures as in Example 1. A mixture of disilanes containing about 42.0 percent $(CH_3)_2ClSiSiCl_2CH_3$, 55.8 percent $(CH_3Cl_3Si)_2$, and 2.1 percent low boiling chlorosilanes was employed. In sample A 434.7 g (2.0 moles) of the disilane mixture and 24.8 g (0.1 moles) of n-octyltrichlorosilane was reacted in the presence of 4.6 g tetra-n-butylphosphonium bromide. In sample B 439.6 g (2.0 moles) of the disilane mixture and 49.9 g (0.2 moles) of n-octyltrichlorosilane was reacted in the presence of 4.9 g tetra-n-butylphosphonium bromide. In sample C 438.6 g (2.0 moles) of the disilane mixture and 24.8 g (0.1 moles) of n-octyltrichlorosilane was reacted in the presence of 4.7 g tetra-n-butylphosphonium bromide. The reactants in A and B were heated from room temperature to 250° C. at 1.5° C./min and held at 250° C. for 30 minutes. The reactants in C were heated from room temperature to 216° C. at a rate of 1.5° C./min. The chlorine content in resulting chlorine-containing polysilanes A and B was estimated to be about 20 percent. Polysilane C contained 32.5 percent chlorine. All three samples were derivatized with hexamethyldisilazane in toluene without the aid of a catalyst using the general procedures of Example 1. They were not treated with ammonia. The following results were obtained for the resulting methylpoly(polysilyl)azanes.

| | A | B | C |
|---|---|---|---|
| Tg, °C. | 150.4 | 68.3 | 88.1 |
| Si, % | 47.7 | 41.0 | 44.7 |
| C, % | 28.6 | 29.4 | 27.2 |
| H, % | 7.00 | 6.72 | 6.14 |
| N, % | 2.82 | 2.70 | 2.08 |
| O, % | 2.90 | 2.05 | 0.97 |
| Cl, % | 7.98 | 7.52 | 14.88 |
| Polymer Yield (g) | 79.9 | 89.6 | 85.8 |
| Molecular Weight (g/mole): | | | |
| Number Av. | 1559 | 1043 | 685 |
| Weight Av. | 3197 | 2503 | 1314 |

The polymers were then fired to 1200° C. under argon as in Example 1. The following results were obtained. Hydrogen was not detected.

| | A | B | C |
|---|---|---|---|
| Ceramic Yield, % | 69.6 | 56.8 | 52.9 |
| Si, % | 64.5 | 62.7 | 65.1 |
| C, % | 15.0 | 21.8 | 17.6 |
| N, % | 2.55 | 4.62 | 2.44 |
| O, % | 3.18 | 4.14 | 5.03 |
| Cl, % | 4.52 | 4.66 | 3.42 |

EXAMPLE 4

A chlorine-containing polysilane with $(CH_3(CH_2)_7Si)$ units was prepared using the same general procedure as in Example 3 by reacting disilanes (487.4 g, 2.2 moles) with n-octyltrichlorosilane (24.9 g, 0.1 moles) in the presence of tetra-n-butylphosphonium bromide (5.1 g) by heating from room temperature to 106° C. at a rate of 2.0° C./min, held at 106° C. for 9 minutes. and from 106° C. to 220° C. at 1.5° C./min under an inert atmosphere while removing by-produced volatile silanes. The source of the disilanes was a Direct Process residue which contained about 9.0 percent $((CH_3)_2ClSi)_2$, 32.9 percent $(CH_3)_2ClSiSiCl_2CH_3$, 57.3 percent $(CH_3Cl_2Si)_2$, and 0.8 percent low boiling chlorosilanes. The resulting chlorine-containing polysilane contained 30.8 percent chlorine This chlorine-containing polysilane was derivatized using 247.3 g (1.54 moles) hexamethyldisilazane with 0.1 g tetra-n-butylphosphonium bromide in toluene (144 g) by heating to 200° C. The solvent and unreacted disilazane were removed by stripping at 220° C. and 20 torr for about 10 minutes. The yield of polymer was 96.5 g. The resulting methylpoly(polysilyl)azane was soluble in toluene with a glass transition temperature of 128.2° C. and number average and weight average molecular weights of 1325 and 4904 g/mole, respectively. The methylpoly(polysilyl)azane contained 49.1 percent silicon 31.6 percent carbon, 6.40 percent nitrogen 8.08 percent hydrogen 0.97 percent oxygen, and 2.5 percent chlorine. The polymer was converted to a ceramic in 56.4 percent yield by pyrolysis to 1200° C. in an inert atmosphere. The ceramic material contained 65.2 percent silicon 23.6 percent carbon, 7.87 percent nitrogen non-detectable levels of hydrogen, 1.50 percent oxygen, and 1.27 percent chlorine.

EXAMPLE 5

A chlorine-containing polysilane with $(CH_3(CH_2)_7Si)$ units was prepared using the same general procedure as in Example 3 by reacting disilanes (435.9 g, 2.0 moles) with n-octyltrichlorosilane (24.8 g, 0.1 moles) in the presence of tetra-n-butylphosphonium bromide (4.7 g) by heating from room temperature to 250° C. at a rate of 1.5° C./min under an inert atmosphere while removing by-produced volatile silanes. The source of the disilanes was a Direct Process residue which contained about 10.0 percent $((CH_3)_2ClSi)_2$, 39.1 percent $(CH_3)_2ClSiSiCl_2CH_3$, 48.8 percent $(CH_3Cl_2Si)_2$, and 2.1 percent low boiling chlorosilanes. The resulting chlorine-containing polysilane contained an estimated 20 percent chlorine. This chlorine-containing polysilane was derivatized using 247.2 g (1.54 moles) hexamethyldisilazane with 1.0 g tetra-n-butylphosphonium bromide. The hexamethyldisilazane acted as both solvent and reactant. The derivatization was carried out by heating the mixture from room temperature to 200° C. at a rate of 1.0° C./min. The polymer yield was 37.2 g. The resulting methylpoly(polysilyl)azane was divided into two portions. Portion A was not treated further. Portion B was treated with ammonia as in Example 1. In both cases the solvent was removed by stripping at 250° C. and 20 torr for 5 minutes. The following results were obtained on the unfired methylpoly(polysilyl)azanes. Both polymers were soluble in toluene.

|                        | A    | B    |
|------------------------|------|------|
| Tg, °C.                | 106.7| 78.0 |
| Si, %                  | 47.9 | 48.2 |
| C, %                   | 34.5 | 34.6 |
| H, %                   | 8.16 | 8.16 |
| N, %                   | 5.48 | 6.27 |
| O, %                   | 1.01 | 1.35 |
| Cl, %                  | 2.49 | 0.07 |
| Molecular Weight (g/mole): |   |      |
| Number Av.             | 955  | 998  |
| Weight Av.             | 2802 | 2710 |

The polymers were then fired to 1200° C. under argon as in Example 1. The following results were obtained Hydrogen was not detected.

|              | A    | B    |
|--------------|------|------|
| Ceramic Yield, % | 51.5 | 40.5 |
| Si, %        | 66.8 | 61.2 |
| C, %         | 25.2 | 24.6 |
| N, %         | 6.30 | 7.07 |
| O, %         | 1.12 | 0.79 |
| Cl, %        | 1.77 | 0.13 |

EXAMPLE 6

Several chlorine-containing methylpolysilanes with (C$_6$H$_5$Si) units were prepared using the same general procedures as in Example 1. In sample A 436.0 g (2.0 moles) disilanes and 63.4 g (0.3 moles) phenyltrichlorosilane was reacted in the presence of 5.0 g tetra-n-butylphosphonium bromide by heating the mixture to 250° C. at a rate of 1.5° C./min. Sample B was prepared by heating a mixture containing 438.9 g (2.0 moles) disilanes, 127.0 g (0.6 moles) phenyltrichlorosilane, and 5.7 g tetra-n-butylphosphonium bromide to 250° C. at a rate of 1.5° C./min. The disilanes were the same as in Example 5. The resulting chlorine-containing polysilanes contained an estimated 20 percent chlorine. Both chlorine-containing polysilanes were derivatized using about 270 g (1.7 moles) hexamethyldisilazane with about 1.0 percent tetra-n-butylphosphonium bromide. The hexamethyldisilazane acted as both solvent and reactant. The solvent was removed by stripping at 250° C. and 20 torr for 10 minutes. The resulting methylpoly(polysilyl)azanes were treated with ammonia as in Example 1. The following results were obtained on the unfired methylpoly(polysilyl)azanes. Both polymers were soluble in toluene.

|         | A    | B     |
|---------|------|-------|
| Tg, °C. | >250 | 135.3 |
| Si, %   | 44.9 | 35.6  |
| C, %    | 42.2 | 51.3  |

-continued

|                        | A    | B    |
|------------------------|------|------|
| H, %                   | 6.92 | 6.58 |
| N, %                   | 5.12 | 4.60 |
| O, %                   | 1.64 | 1.36 |
| Cl, %                  | 0.42 | 0.23 |
| Polymer Yield (g)      | 77.8 | 91.5 |
| Molecular Weight (g/mole): |   |      |
| Number Av.             | 1345 | 608  |
| Weight Av.             | 3199 | 989  |

The polymers were then fired to 1200° C. under argon as in Example 1. The following results were obtained Hydrogen was not detected.

|                   | A    | B    |
|-------------------|------|------|
| Ceramic Yield, %  | 69.4 | 59.6 |
| Si, %             | 56.7 | 48.5 |
| C, %              | 36.4 | 44.0 |
| N, %              | 6.04 | 5.52 |
| O, %              | 0.42 | —    |
| Cl, %             | 0.46 | <0.1 |

EXAMPLE 7

Several chlorine-containing methylpolysilanes which contained both (CH$_3$(CH$_2$)$_7$Si) and (C$_6$H$_5$Si) units were prepared using the same general procedures as in Example 1. The disilanes were the same as used in Example 5. The chlorine-containing polysilane A was prepared from 438.4 g (2.0 moles) disilanes. 21.2 g (0.1 moles) phenyltrichlorosilane, 24.8 g (0.1 moles) n-octyltrichlorosilane, and 4.8 g (1.0 percent) tetra-n-butylphosphonium bromide. The chlorine-containing polysilane B was prepared from 438.6 g (2.0 moles) disilanes, 21.1 g (0.1 moles) phenyltrichlorosilane, 74.3 g (0.3 moles) n-octyltrichlorosilane, and 5.3 g (1.0 percent) tetra-n-butylphosphonium bromide. The chlorine-containing polysilane C was prepared from 437.7 g (2.0 moles) disilanes 10.7 g (0.05 moles) phenyltrichlorosilane, 12.4 g (0.05 moles) n-octyltrichlorosilane, and 4.6 g (1.0 percent) tetra-n-butylphosphonium bromide. The reactions were carried out by heating the mixtures from room temperature to 250° C. at a rate of 1.5° C./min as in Example 1. The chlorine content of these polysilanes is estimated to be about 20 percent. Each chlorine-containing polysilane was derivatized using hexamethyldisilazane (140.1 g. 182.6 g. and 120.4 g for A, B, and C, respectively) and about 1.0 percent tetra-n-butylphosphonium bromide in a toluene solvent. Each methylpoly(polysilyl)azane was then treated with ammonia as in Example 1. Methylpoly(polysilyl)azane A was soluble in toluene whereas B and C were insoluble.

|                        | A     | B    | C     |
|------------------------|-------|------|-------|
| Tg, °C.                | 160.8 | 54.5 | 153.5 |
| Si, %                  | 45.0  | —    | —     |
| C, %                   | 37.9  | —    | —     |
| H, %                   | 8.1   | —    | —     |
| N, %                   | 6.4   | —    | —     |
| O, %                   | 1.1   | 2.8  | 2.6   |
| Cl, %                  | 0.5   | 0.2  | —     |
| Polymer Yield (g)      | 78.7  | 85.5 | —     |
| Molecular Weight (g/mole): |   |      |       |

|  | A | B | C |
|---|---|---|---|
| Number Av. | 814 | 1056 | — |
| Weight Av. | 7870 | 16636 | — |

The polymers A and B were then fired to 1200° C. under argon as in Example 1 to obtain ceramic materials with yields of 59.4 and 61.3 percent, respectively.

EXAMPLE 8

Several chlorine-containing methylpoly(polysilyl)azanes which contained both $(CH_3(CH_2)_7Si)$ and $(C_6H_5Si)$ units were prepared using the same general procedures as in Example 1. The disilanes were the same as used in Example 5. The chlorine-containing polysilanes A and B were prepared by reacting 436.1 g (2.0 moles) disilanes, 21.2 g (0.1 moles) phenyltrichlorosilane, 24.7 g (0.1 moles) n-octyltrichlorosilane, and 4.9 g tetra-n-butylphosphonium bromide. The chlorine-containing polysilanes C was prepared by reacting 436.4 g (2.0 moles) disilanes, 63.5 g (0.3 moles) phenyltrichlorosilane, 24.7 g (0.1 moles) n-octyltrichlorosilane, and 5.3 g tetra-n-butylphosphonium bromide. The chlorine-containing polysilanes D was prepared by reacting 436.5 g (2.0 moles) disilanes, 127.1 g (0.6 moles) phenyltrichlorosilane, 24.8 g (0.1 moles) n-octyltrichlorosilane, and 5.9 g tetra-n-butylphosphonium bromide. All samples heated to 250° C. at a rate of 1.5° C./min while removing volatile by-products. The chlorine-containing polysilanes were estimated to contain 20 percent chlorine. All samples were then converted to methylpoly(polysilyl)azanes by derivatization with about 179 g (1.1 moles) hexamethyldisilazane in the presence of about 1.0 percent tetra-n-butylphosphonium bromide by heating to 200° C. at a rate of 1.0° C./min. Methylpoly(polysilyl)azane samples B, C, and D were further reacted with ammonia as in Example 1. All the methylpoly(polysilyl)azanes were soluble in toluene. The following results were obtained

|  | A | B | C | D |
|---|---|---|---|---|
| Tg, °C. | 92.2 | 105.7 | 100.1 | 79.1 |
| Si, % | — | 46.3 | 39.2 | 32.8 |
| C, % | — | 38.2 | 43.8 | 53.6 |
| H, % | — | 8.60 | 8.14 | 7.56 |
| N, % | — | 5.43 | 5.03 | 4.74 |
| O, % | — | 1.35 | 0.96 | 0.84 |
| Cl, % | 0.77 | 0.06 | 0.70 | 0.34 |
| Polymer Yield (g) | 84.9 | 77.7 | 88.1 | 106.4 |
| Molecular Weight (g/mole): |  |  |  |  |
| Num. Av. | 836 | 1526 | 1183 | 735 |
| Wt. Av. | 1835 | 2716 | 2129 | 1156 |

The methylpoly(polysilyl)azanes were then fired to 1200° C. under argon at a rate of about 3.0° C./min as in Example 1. The following results were obtained. Hydrogen was not detected.

|  | A | B | C | D |
|---|---|---|---|---|
| Ceramic Yield, % | 45.1 | 48.1 | 53.8 | 50.1 |
| Si, % | 64.5 | 64.0 | 54.6 | 47.7 |
| C, % | 28.3 | 29.0 | 34.2 | 43.6 |
| N, % | 5.8 | 6.58 | 7.02 | 6.34 |
| O, % | 0.39 | 0.65 | 0.89 | 0.62 |
| Cl, % | 1.14 | <0.1 | 0.17 | 0.26 |

EXAMPLE 9

A chlorine-containing polysilane with $(CH_3(CH_2)_7Si)$ units was prepared using the same general procedure as in Example 3 by reacting disilanes (481.8 g, 2.2 moles) with n-octyltrichlorosilane (24.7 g, 0.1 moles) in the presence of tetra-n-butylphosphonium bromide (5.1 g) by heating from room temperature to 250° C. at a rate of 1.5° C./min under an inert atmosphere while removing by-produced volatile silanes. The disilanes were the same as used in Example 4. The resulting chlorine-containing polysilane contained an estimated 20 percent chlorine. This chlorine-containing polysilane was derivatized using 145.2 g (0.78 moles) symdivinyltetramethyldisilazane with 1.0 g (1.0 percent) tetra-n-butylphosphonium bromide in toluene (about 110 g) by heating to 200° C. at a rate of 1.0° C./min. The vinyl-containing alkylpoly(polysilyl)azane was dissolved in toluene and treated with ammonia as in Example 1. The solvent was removed by stripping at 220° C. and 140 torr for one minute. The polymer yield was 96.4 g. The resulting polymer was soluble in toluene and had a Tg of 125.5° C. The resulting polymer had the following elemental composition, 44.5% silicon. 32.8% carbon. 7.5% hydrogen, 4.0% nitrogen, 0.6% oxygen, and 0.2% chlorine. The alkylpoly(polysilyl)azane was converted to a ceramic material in 82.0 percent yield by pyrolysis to 1200° C. at a rate of about 3.0° C./min under an argon atmosphere. The ceramic material contained 59.8% silicon, 28.2% carbon, non-detectable hydrogen, 6.6% nitrogen, 0.95% oxygen, and 0.22% chlorine.

EXAMPLE 10

A chlorine-containing methylpolysilane which contained both $(Cl_3SiCH_2CH_2Si)$ and $(CH_3(CH_2)_7Si)$ units was prepared using the same general procedures as in Example 1 by reacting disilanes (436.8 g 2.0 moles) with 14.7 g (0.05 moles) $Cl_3SiCH_2CH_2SiCl_3$ and n-octyltrichlorosilane (24.7 g, 0.1 moles) in the presence of tetra-n-butylphosphonium bromide (5.1 g, 1.0 percent) by heating from room temperature to 250° C. at a rate of 1.5° C./min under an inert atmosphere while removing by-produced volatile silanes. The disilanes were the same as used in Example 5. The resulting chlorine-containing polysilane contained an estimated 20 percent chlorine. This chlorine-containing polysilane was derivatized using 242.8 g (1.5 moles) hexamethyldisilazane with 1.0 g (1.0 percent) tetra-n-butylphosphonium bromide. The solvent was removed by stripping. The resulting methylpoly(polysilyl)azane was soluble in toluene and had a Tg of 166.2° C. The polymer had the following elemental composition: 43.3% silicon, 35.8% carbon, 9.3% hydrogen, 5.1% nitrogen, 2.9% oxygen, and 3.5% chlorine. The number average and weight average molecular weights were 2512 and 9808 g/mole, respectively. The methylpoly(polysilyl)azane was converted to a ceramic material in 69.3 percent yield by pyrolysis to 1200° C. at a rate of about 3.0° C./min.

EXAMPLE 11

A chlorine-containing polysilane with $(CH_3(CH_2)_7Si)$ units was prepared using the same general procedure as in Example 3 by reacting disilanes (436.0 g, 2.0 moles) with n-octyltrichlorosilane (10.0 g, 0.04 moles) in the presence of tetra-n-butylphosphonium bromide (4.4 g) by heating from room temperature to 100° C. at a rate of 8.0° C./min and from 100° to 230° C. at a rate of 2.0° C./min under an inert atmosphere while removing by-produced volatile silanes. The disilanes were the same as used in Example 5. The resulting chlorine-containing polysilane contained an estimated 20 percent chlorine. This chlorine-containing polysilane was derivatized using 200 g (1.5 moles) sym-dihydrogentetramethyldisilazane. Unreacted disilazane was removed by strip distillation. The resulting methylpoly(polysilyl)azane was soluble in toluene and had a Tg of 51.1° C. The resulting polymer had the following elemental composition: 50.6% silicon, 28.6% carbon, 7.7% hydrogen, 4.6% nitrogen, 0.86% oxygen, and less than 1.0% chlorine. The methylpoly(polysilyl)azane was converted to a ceramic material in 41.43 percent yield by pyrolysis to 1200° C. at a rate of about 3.0° C./min under an argon atmosphere. The ceramic material contained 68.1% silicon, 24.8% carbon, non-detectable hydrogen, 3.8% nitrogen, 0.82% oxygen, and 0.77% chlorine.

That which is claimed:

1. An alkylpoly(polysilyl)azane of the average formula $$(R_2Si)(RSi) \qquad (I)$$

containing from 0 to 60 mole percent $(R_2Si)$ units and 40 to 100 mole percent $(RSi)$ units, where each R is independently selected from alkyl radicals containing 1 to 4 carbon atoms and where there is also bonded to the silicon atoms other silicon atoms and radicals having the formula $-NHSiR_3''$ wherein each $R''$ is independently selected from hydrogen, alkyl radicals having 1 to 4 carbon atoms, a vinyl radical, or a phenyl radical.

2. An alkylpoly(polysilyl)azane as claimed in claim 1 wherein R is a methyl radical.

3. An alkylpoly(polysilyl)azane as claimed in claim 1 wherein $R''$ is a methyl radical.

4. An alkylpoly(polysilyl)azane as claimed in claim 1 wherein R and $R''$ are methyl radicals.

5. An alkylpoly(polysilyl)azane as claimed in claim 1 wherein the alkylpoly(poylsilyl)azane contains less than 2 weight percent chlorine or bromine.

6. An alkylpoly(polysilyl)azane as claimed in claim 1 wherein the alkylpoly(poylsilyl)azane contains less than 0.5 weight percent chlorine or bromine.

7. An alkylpoly(polysilyl)azane as claimed in claim 4 wherein the alkylpoly(poylsilyl)azane contains less than 2 weight percent chlorine or bromine.

8. An alkylpoly(polysilyl)azane as claimed in claim 4 wherein the alkylpoly(poylsilyl)azane contains less than 0.5 weight percent chlorine or bromine.

9. An alkylpoly(polysilyl)azane of the average formula $$(R_2Si)(RSi)(R'Si) \qquad (II)$$

where each R is independently selected from alkyl radicals containing 1 to 4 carbon atoms wherein each $R'$ is independently selected from the group consisting of alkyl radicals of at least six carbon atoms, phenyl radicals, and radicals of the formula $A_yX_{(3-y)}Si(CH_2)_z-$ where each A is independently selected from a hydrogen atom or alkyl radicals containing 1 to 4 carbon atoms, y is an integer equal to 0 to 3, X is chlorine or bromine, and z is an integer greater than or equal to 1, wherein there are from 0 to 40 mole percent $(R_2Si)$ units, 1 to 99 mole percent (RSi), and 1 to 99 mole percent $(R'Si)$ units, and wherein there is also bonded to the silicon atoms other silicon atoms and radicals having the formula $-NHSiR_3''$ wherein each $R''$ is independently selected from a vinyl radical, alkyl radical having 1 to 4 carbon atoms, or a phenyl radical.

10. An alkylpoly(polysilyl)azane as claimed in claim 9 which contains from 0 to 40 mole percent $((CH_3)_2Si)$ units, 40 to 99 mole percent $(CH_3Si)$, and 1 to 30 mole percent $(R'Si)$ units.

11. An alkylpoly(polysilyl)azane as claimed in claim 10 which contains from 0 to 10 mole percent $((CH_3)_2Si)$ units, 80 to 99 mole percent $(CH_3Si)$, and 1 to 20 mole percent $(R'Si)$ units.

12. An alkylpoly(polysilyl)azane as claimed in claim 10 wherein $R''$ is a methyl radical.

13. An alkylpoly(polysilyl)azane as claimed in claim 10 wherein $R'$ is an n-octyl radical.

14. An alkylpoly(polysilyl)azane as claimed in claim 10 wherein $R'$ is a phenyl radical.

15. An alkylpoly(polysilyl)azane as claimed in claim 10 which contains both $(CH_3(CH_2)_7Si)$ and $(C_6H_5Si)$ units.

16. An alkylpoly(polysilyl)azane as claimed in claim 10 wherein the alkylpoly(polysilyl)azane contains less than 2 weight percent chlorine or bromine.

17. An alkylpoly(polysilyl)azane as claimed in claim 10 wherein the alkylpoly(polysilyl)azane contains less than 0.5 weight percent chlorine or bromine.

18. An alkylpoly(polysilyl)azane as claimed in claim 15 wherein the alkylpoly(polysilyl)azane contains less than 2 weight percent chlorine or bromine.

19. An alkylpoly(polysilyl)azane as claimed in claim 15 wherein the alkylpoly(polysilyl)azane contains less than 0.5 weight percent chlorine or bromine.

20. A method of preparing an alkylpoly(polysilyl)azane having the average formula $$(R_2Si)(RSi) \qquad (I)$$

where there are from 0 to 60 mole percent $(R_2Si)$ units and 40 to 100 mole percent $(RSi)$ units, where each R is independently selected from alkyl radicals containing 1 to 4 carbon atoms, and where there is also bonded to the silicon atoms other silicon atoms and radicals having the formula $-NHSiR_3''$ where each $R''$ is independently selected from hydrogen, alkyl radicals having 1 to 4 carbon atoms, a vinyl radical, or a phenyl radical, which method comprises (A) reacting under anhydrous conditions a (1) polysilane having the average formula $$(R_2Si)(RSi) \qquad (III)$$

in which there are from 0 to 60 mole percent $(R_2Si)$ units and 40 to 100 mole percent $(RSi)$ units, wherein each R is independently selected from alkyl radicals containing 1 to 4 carbon atoms, and where the remaining bonds on silicon are attached to other silicon atoms and either chlorine atoms or bromine atoms with (2) a disilazane of general formula $(R_3''Si)_2NH$ wherein each $R''$ is independently selected from hydrogen, alkyl radicals containing 1 to 4 carbon atoms, a vinyl radical, or a phenyl radical at a temperature of 50° to 300° C. and (B) thereafter recovering the alkylpoly(polysilyl)azane.

21. A method as claimed in claim 20 wherein the reaction in step A is carried out in the presence of 0.001 to 10 weight percent of a catalyst selected from the group consisting of ammonium halides, tertiary organic amines, quaternary ammonium halides, quaternary phosphonium halides, hexamethylphosphoramide, and silver cyanide.

22. A method as claimed in claim 21 wherein the reaction in step A is carried out in the presence of 0.1 to 2.0 weight percent of a catalyst selected from the group consisting of quaternary ammonium halides of general formula $W_4NX'$, quaternary phosphonium halides of the general formula $W_4PX'$, and hexamethylphosphoramide where W is an alkyl or aryl radical and X is a halogen atom.

23. A method as claimed in claim 22 wherein the catalyst is selected from the group consisting of quaternary ammonium halides of general formula $W_4NX'$ and quaternary phosphonium halides of the general formula $W_4PX'$ where W is an alkyl radical contain 1 to 6 carbon atoms or a phenyl radical and $X'$ is chlorine or bromine.

24. A method as claimed in claim 23 wherein the catalyst is tetra-n-butylphosphonium bromide or tetra-n-butylphosphonium chloride.

25. A method as claimed in claim 20 wherein the disilazane is present in a stoichiometric excess relative to the chlorine or bromine content of polysilane III whereby the disilazane acts as both reactant and solvent.

26. A method as claimed in claim 23 wherein the disilazane is present in a stoichiometric excess relative to the chlorine or bromine content of polysilane III whereby the disilazane acts as both reactant and solvent.

27. A method as claimed in claim 20 wherein the alkylpoly(polysilyl)azane is further treated with ammonia whereby the halide content of the alkylpoly(polysilyl)azane is reduced.

28. A method as claimed in claim 23 wherein the alkylpoly(polysilyl)azane is further treated with ammonia whereby the halide content of the alkylpoly(polysilyl)azane is reduced to less than 0.5 weight percent.

29. A method as claimed in claim 20 wherein R is a methyl radical.

30. A method as claimed in claim 20 wherein R is a methyl radical.

31. A method as claimed in claim 20 wherein R and $R''$ are methyl radicals.

32. A method as claimed in claim 23 wherein R is a methyl radical.

33. A method as claimed in claim 23 wherein $R''$ is a methyl radical.

34. A method as claimed in claim 23 wherein R and $R''$ are methyl radicals.

35. A method as claimed in claim 28 wherein R and $R''$ are methyl radicals.

36. A method of preparing an alkylpoly(polysilyl)azane having the average formula $$(R_2Si)(RSi)(R'Si) \qquad (III)$$

where each R is independently selected from alkyl radicals containing 1 to 4 carbon atoms, wherein each $R'$ is independently selected from the group consisting of alkyl radicals of at least six carbon atoms, phenyl radicals, and radicals of the formula $A_yX_{(3-y)}Si(CH_2)_z$— where each A is independently selected from a hydrogen atom or alkyl radical containing 1 to 4 carbon atoms, y is an integer equal to 0 to 3, X is chlorine or bromine, and z is an integer greater than or equal to 1, wherein there are from 0 to 40 mole percent $(R_2Si)$ units, 1 to 99 mole percent (RSi) units, and 1 to 99 mole percent $(R'Si)$ units, and where there is also bonded to the silicon atoms other silicon atoms and radicals having the formula $-NHSiR_3''$ where each $R''$ is independently selected from hydrogen, alkyl radicals having 1 to 4 carbon atoms, a vinyl radical, or a phenyl radical, which method comprises (A) reacting under anhydrous conditions a (1) polysilane having the average formula $$(R_2Si)(RSi)(R'Si) \qquad (IV)$$

in which each R is independently selected from alkyl radicals containing 1 to 4 carbon atoms, each $R'$ is independently selected from the group consisting of alkyl radicals of at least six carbon atoms, phenyl radicals, and radicals of the formula $A_yX_{(3-y)}Si(CH_2)_z$— where each A is independently selected from a hydrogen atom or alkyl radicals containing 1 to 4 carbon atoms, y is an integer equal to 0 to 3, X is chlorine or bromine, and z is an integer greater than or equal to 1, and there are from 0 to 40 mole percent $(R_2Si)$ units, 1 to 99 mole percent (RSi) units, and 1 to 99 mole percent $(R'Si)$ units, wherein the remaining bonds on silicon are attached to other silicon atoms and either chlorine atoms or bromine atoms with (2) a disilazane of general formula $(R_3''Si)_2NH$ where each $R''$ is independently selected from hydrogen, alkyl, alkyl radicals containing 1 to 4 carbon atoms, a vinyl radical, or a phenyl radical at a temperature of 50° to 300° C. and (B) thereafter recovering the alkylpoly)polysilyl)azane.

37. A method as claimed in claim 36 wherein the alkylpoly(polysilyl)azane contains from 0 to 40 mole percent $((CH_3)_2Si)$ units, 40 to 99 mole percent $(CH_3Si)$, and 1 to 30 mole percent $(R'Si)$ units.

38. A method as claimed in claim 37 wherein the alkylpoly(polysilyl)azane contains from 0 to 10 mole percent $((CH_3)_2Si)$ units, 80 to 99 mole percent $(CH_3Si)$, and 1 to 20 mole percent $(R'Si)$ units.

39. A method as claimed in claim 37 wherein the reaction in step A is carried out in the presence of 0.001 to 10 weight percent of a catalyst selected from the group consisting of ammonium halides, tertiary organic amines, quaternary ammonium halides, quaternary phosphonium halides, hexamethylphosphoramide, and silver cyanide.

40. A method as claimed in claim 37 wherein the reaction in step A is carried out in the presence of 0.1 to 2.0 weight percent of a catalyst selected from the group consisting of quaternary ammonium halides of general formula $W_4NX'$, quaternary phosphonium halides of the general formula $W_4PX'$, and hexamethylphosphoramide where W is an alkyl or aryl radical and X' is a halogen.

41. A method as claimed in claim 40 wherein the catalyst is selected from the group consisting of quaternary ammonium halides of general formula $W_4NX'$ and quaternary phosphonium halides of the general formula $W_4PX'$ where W is an alkyl radical contain 1 to 6 carbon atoms or a phenyl radical and X' is chlorine or bromine.

42. A method as claimed in claim 41 wherein the catalyst is tetra-n-butylphosphonium bromide or tetra-n-butylphosphonium chloride.

43. A method as claimed in claim 37 wherein the disilazane is present in a stoichiometric excess relative to the chlorine or bromine content of polysilane IV whereby the disilazane acts as both reactant and solvent.

44. A method as claimed in claim 41 wherein the disilazane is present in a stoichiometric excess relative to the chlorine or bromine content of polysilane IV whereby the disilazane acts as both reactant and solvent.

45. A method as claimed in claim 37 wherein the alkylpoly(polysilyl)azane is further treated with ammonia whereby the halide content of the alkylpoly(polysilyl)azane is reduced.

46. A method as claimed in claim 41 wherein the alkylpoly(polysilyl)azane is further treated with ammonia whereby the halide content of the alkylpoly(polysilyl)azane is reduced to less than 0.5 weight percent.

47. A method as claimed in claim 44 wherein the alkylpoly(polysilyl)azane is further treated with ammonia whereby the halide content of the alkylpoly(polysilyl)azane is reduced to less than 0.5 weight percent.

48. A method as claimed in claim 37 wherein R and R'' are methyl radicals and R' is an n-octyl radical.

49. A method as claimed in claim 41 wherein R'' is a methyl radical and R' is an n-octyl radical.

50. A method as claimed in claim 37 wherein R'' is a methyl radical and R' is a phenyl radical.

51. A method as claimed in claim 41 wherein R'' is a methyl radical and R' is a phenyl radical.

52. A method as claimed in claim 37 wherein the polysilane IV contains both $(CH_3(CH_2)_7Si)$ and $(C_6H_5Si)$ units.

53. A method as claimed in claim 41 wherein the polysilane IV contains both $(CH_3(CH_2)_7Si)$ and $(C_6H_5Si)$ units.

54. A method as claimed in claim 43 wherein the polysilane IV contains both $(CH_3(CH_2)_7Si)$ and $(C_6H_5Si)$ units.

55. A method as claimed in claim 46 wherein the polysilane IV contains both $(CH_3(CH_2)_7Si)$ and $(C_6H_5Si)$ units.

* * * * *